United States Patent
Malaubier et al.

(10) Patent No.: US 6,415,743 B2
(45) Date of Patent: Jul. 9, 2002

(54) METHOD OF DECREASING NITROGEN OXIDE EMISSIONS IN A CIRCULATING FLUIDIZED BED COMBUSTION SYSTEM

(75) Inventors: François Malaubier, Le Plessis Robinson; Eugène Guilleux, Villebon sur Yvette, both of (FR)

(73) Assignee: ABB Alstom Power Combustion, Velizy-Villacoublay (FR)

( * ) Notice: Subject to any disclaimer, the term of this patent is extended or adjusted under 35 U.S.C. 154(b) by 0 days.

(21) Appl. No.: 09/739,105

(22) Filed: Dec. 19, 2000

(30) Foreign Application Priority Data

Nov. 22, 1999 (FR) .............................. 99 16244

(51) Int. Cl.⁷ ................................. F23J 15/02
(52) U.S. Cl. ................ 122/4 D; 165/104.16; 110/204; 110/345
(58) Field of Search ............. 122/4 D; 432/15, 432/58; 165/104.16, DIG. 920; 110/203, 204, 245, 342, 345

(56) References Cited

U.S. PATENT DOCUMENTS

| | | | |
|---|---|---|---|
| 4,257,478 A | * 3/1981 | Stendahl | 165/104.16 |
| 5,054,435 A | 10/1991 | Horst et al. | |
| 5,218,932 A | * 6/1993 | Abdulally | 122/4 D |
| 5,339,774 A | * 8/1994 | Tang | 122/4 D |
| 5,341,766 A | 8/1994 | Hyppanen | |
| 6,067,943 A | * 5/2000 | Morin et al. | 122/4 D |

FOREIGN PATENT DOCUMENTS

| WO | WO 94/11672 | 5/1994 |
|---|---|---|
| WO | WO 97/46829 | 12/1997 |

* cited by examiner

Primary Examiner—Gregory Wilson
(74) Attorney, Agent, or Firm—Sughrue Mion, PLLC

(57) ABSTRACT

In a combustion installation for burning a fuel, which installation includes a hearth operating as a circulating fluidized bed, and in which installation at least a fraction of the flow of solid particles resulting from the combustion of the fuel in the hearth is returned to the hearth via a heat exchanger operating as a fluidized bed, the method of decreasing nitrogen oxide emissions consisting in the heat exchanger being fed with a fluidization gas which is considerably poorer in oxygen than air.

3 Claims, 2 Drawing Sheets

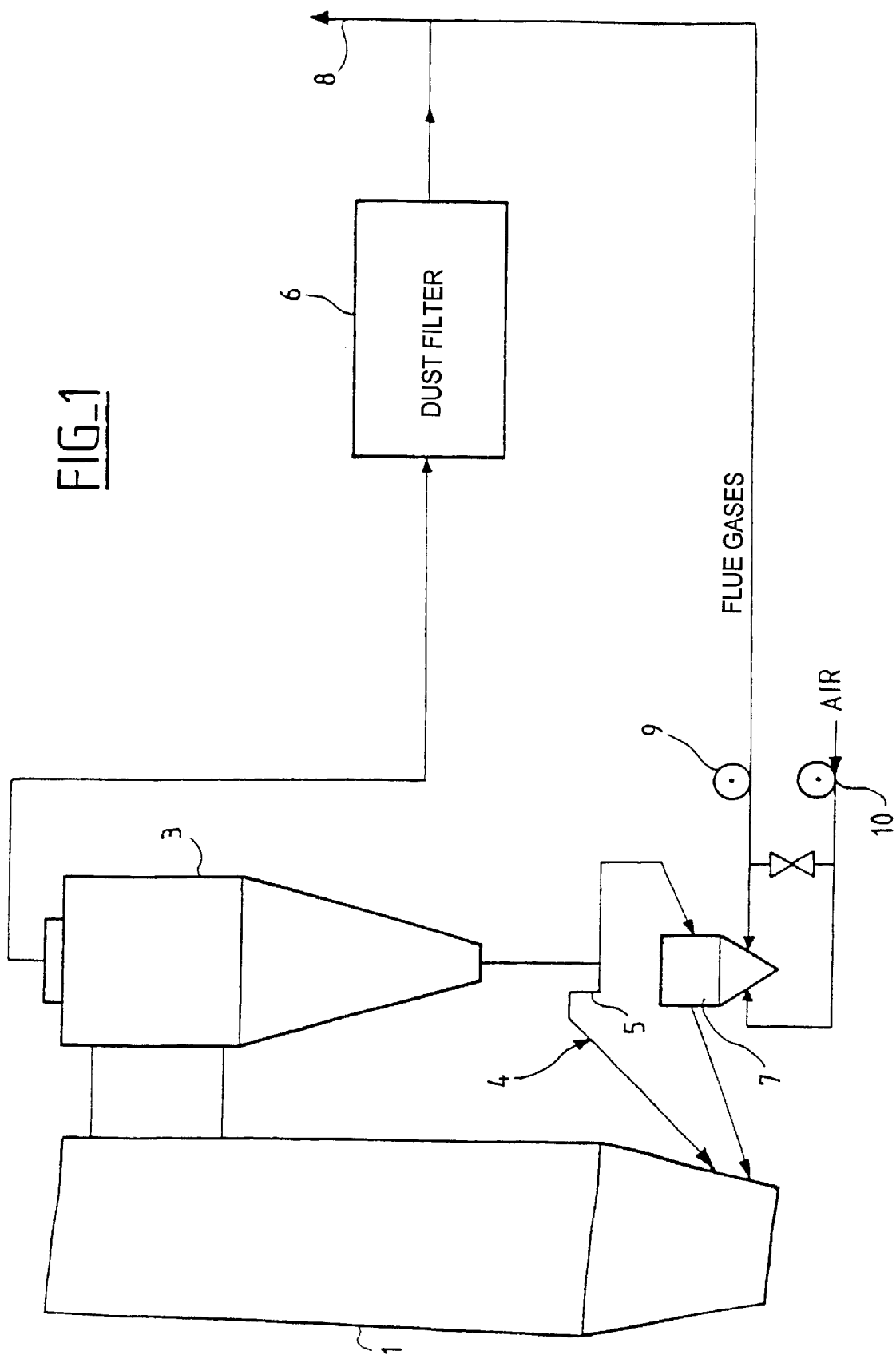
FIG_1

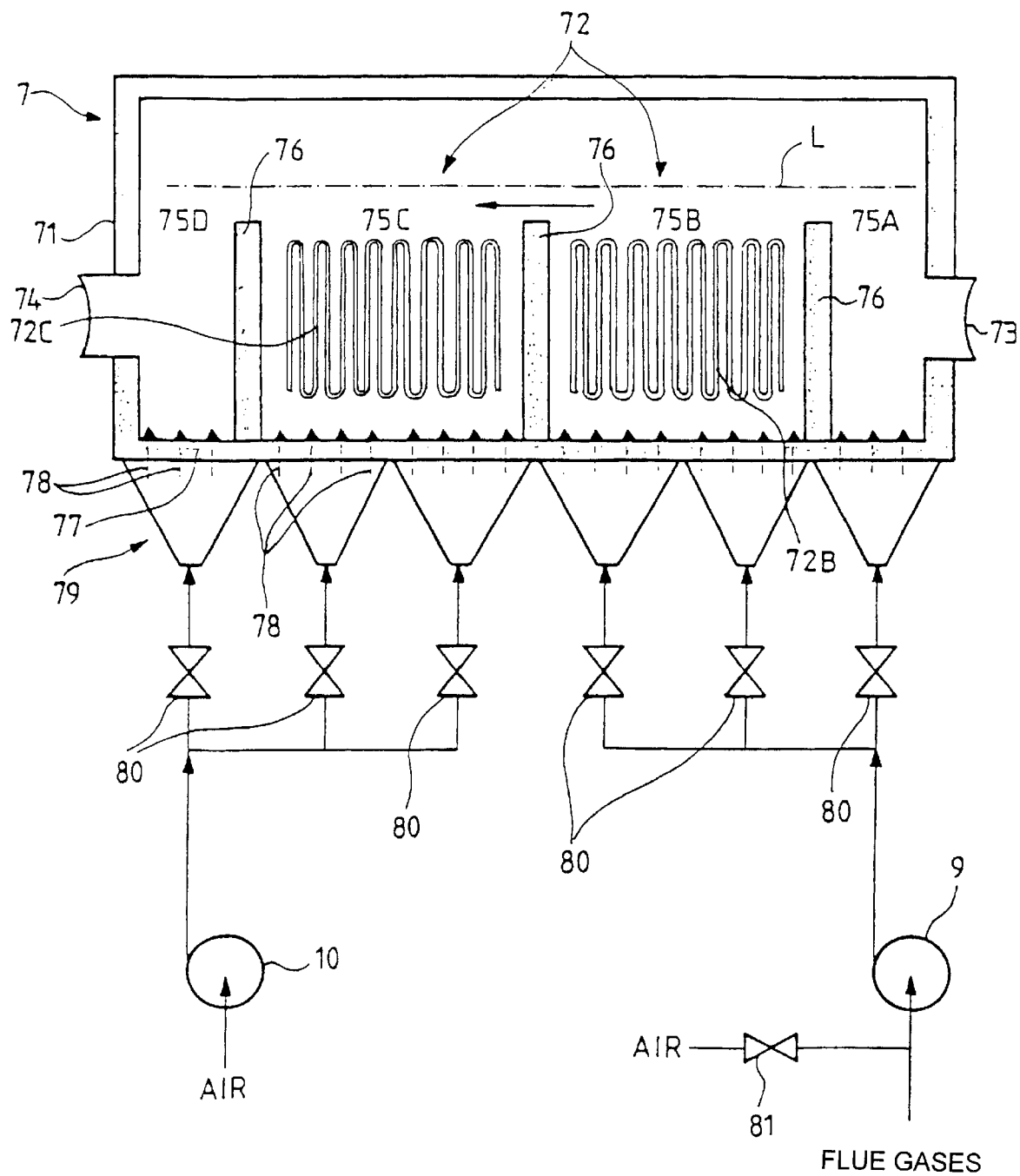

METHOD OF DECREASING NITROGEN OXIDE EMISSIONS IN A CIRCULATING FLUIDIZED BED COMBUSTION SYSTEM

The invention relates to a combustion installation for burning a fuel, which installation includes a hearth operating as a circulating fluidized bed, and in which installation at least a fraction of the flow of solid particles resulting from the combustion of the fuel in the hearth is returned to the hearth via a heat exchanger operating as a fluidized bed.

BACKGROUND OF THE INVENTION

In a circulating fluidized bed installation, the fuel, which may be crushed coal, is usually injected into the bottom portion of the hearth, where a reducing atmosphere prevails.

In that zone, the fuel is subjected to pyrolysis, with the combustible matter being separated firstly into volatile matter containing a fraction of the nitrogen from the original fuel (volatile-N), and secondly into solid matter containing the remaining nitrogen from the original fuel (coke-N). The coke grains can remain for various lengths of time in the bottom portion of the hearth, where a reducing atmosphere prevails. Under those conditions, the reaction products of the coke-N contain molecular nitrogen rather than the pollutant NOx. The time for which the coke grains remain in the reducing zone depends essentially on the size of each grain. The finest particles leave the zone rapidly and then pass through the top portion of the hearth, where the reactions continue.

More particularly in FIG. 1, the flow of solid particles coming from the hearth 1 and collected by a suitable device such as a cyclone 3 is made up not only of inorganic ash but also of coke resulting from the fuel burning incompletely in the hearth. That coke contains the original elements of the fuel, and in particular carbon, sulfur, and nitrogen.

Those solid particles are sent back to the hearth via a suitable device such as a recycling loop 4 equipped with a siphon 5. In FIG. 1, a fraction of the flow of solid particles recycled to the hearth 1 goes through a heat exchanger 7 operating as a fluidized bed. In FIG. 2, a heat exchanger 7 operating as a fluidized bed is constituted by a casing 71 containing packets of zigzag tubes 72 through which water or steam flows. The flow of solid particles enters via an inlet duct 73 and passes through the heat exchanger by means of a fluidization system and then exits via an outlet duct 74. The top level of the bed of solid particles in the heat exchanger is indicated by the line L. In this example, the heat exchanger 7 is outside the hearth 1 and only a fraction of the flow of solid particles being recycled to the hearth 1 passes through it. It is to be understood that the following description also applies when the heat exchanger 7 is part of the hearth 1 and receives the entire flow of solid particles.

In FIG. 2, the inside of the casing 71 of the heat exchanger 7 is subdivided into a plurality of chambers 75A, 75B, 75C, 75D, separated by walls 76. The chambers 75B and 75C receive the packets of tubes 72B, 72C through which water or steam passes internally. The floor 77 of the heat exchanger is equipped with nozzles 78 making it possible to inject gas for fluidizing the solids. Below the floor 77, a wind box 79 is placed that contains the fluidization gas. The wind box 79 may optionally be subdivided into at least as many compartments 79A, 79B, 79C, 79D as there are chambers inside the casing.

After passing through the solids from the bottom at floor level to above the top level L of the bed of solid particles, the fluidization gases are removed via the outlet duct 74 to the hearth 1. As the solids pass through the heat exchanger 7, their temperature is lowered from the temperature they have at the outlet of the cyclone (about 850° C. to 900° C.) to a temperature of about 500° C. to 700° C. depending on the number and the surface area of the tubes 72 inside the casing 71.

In the state of the art, the fluidization gas used in the heat exchanger 7 is atmospheric air that is usually at a temperature of in the range 20° C. to 300° C. and at a compression level that is sufficient to enable the solids to flow from the inlet chamber 75A to the outlet chamber 75D, for example. An atmosphere that is strongly oxidizing, or, in other words, an atmosphere that has a very high oxygen partial pressure, prevails in each chamber. That technique suffers from the drawback that nitrogen oxides form by reaction between the above-mentioned coke-N and the fluidization air of the heat exchanger 7. The production of nitrogen oxide is much higher in the inlet chambers 75A, 75B than in the outlet chambers 75C, 75D because of the amount of coke-N consumed in the inlet chambers and, above all, because the temperature of the solids is much higher in the inlet chambers than in the outlet chambers. By way of example, for a heat exchanger having four chambers as shown in FIG. 2, the temperature of the solids is typically about 850° C. to 800° C. in chamber 75A, about 650° C. to 800° C. in chamber 75B, and about 500° C. to 650° C. in chamber 75C. The nitrogen oxides that are formed in the chambers by reaction between the coke-N and the fluidization air are thus conveyed to the hearth, where they mix with the flue gases produced, thereby participating in the overall emission of pollutant.

OBJECTS AND SUMMARY OF THE INVENTION

An object of the invention is to decrease the emission of nitrogen oxides in such an installation.

To this end, the invention provides a method of decreasing nitrogen oxide emissions in a combustion installation for burning a fuel, which installation includes a hearth operating as a circulating fluidized bed, and in which installation at least a fraction of the flow of solid particles resulting from the combustion of the fuel in the hearth is returned to the hearth via a heat exchanger operating as a fluidized bed, wherein the heat exchanger is fed with a fluidization gas which is considerably poorer in oxygen than air.

The idea behind the invention is thus to control the oxygen partial pressure inside the chambers of the heat exchanger so as to minimize any formation of nitrogen oxides. The oxygen partial pressure is controlled to lie in the range 1% to 4%. The oxygen-poor fluidization gas, typically containing less than 12% (molar) of oxygen, is preferably constituted by flue gases preferably taken downstream from a dust filter for removing dust from the flue gases. Dust is thus removed from the flue gases, which dust could otherwise damage, by abrasion or clogging, the fans used to send the fluidization gas under pressure into the heat exchanger.

Each heat-exchange chamber of the heat exchanger is fed separately with the oxygen-poor fluidization gas used on its own or as mixed with air. By adjusting the proportion of air in the mixture, it is thus possible to obtain combustion of the carbon in the heat exchanger in the presence of an atmosphere having a low oxygen content, and thus with minimized nitrogen oxide emissions.

To avoid recycling too much flue gas into the heat exchanger, it is advantageous to feed the coldest chambers of the heat exchanger with air not mixed with the flue gases because nitrogen oxide formation is low in those chambers.

BRIEF DESCRIPTION OF THE DRAWINGS

FIG. 1 shows a combustion installation for implementing the method of the invention.

FIG. 2 is a more detailed view of a fluidized bed heat exchanger.

MORE DETAILED DESCRIPTION

The combustion installation shown in FIG. 1 is described in part above. The flue gases that exit from the top of the cyclone 3 go through an electrostatic or bag dust filter for removing the dust from them before they are removed via a chimney. Downstream from the dust filter 6, a fraction of the flue gases is taken to serve as fluidization gas for the heat exchanger 7 after being blown by a fan 9. Air blown by a fan 10 may also be used to fluidize the flow of solid particles in the heat exchanger 7 as shown in FIG. 2.

In FIG. 2, the flue gases on their own or as mixed with air feed the hottest chambers 75A and 75B of the heat exchanger 7 so as to fluidize the flow of solid particles. The coldest chambers 75C and 75D are preferably fed with air only. Whether the fluidization gas is constituted by air on its own, by flue gases on their own, or by a mixture of flue gases and of air, the flow rate of the fluidization gas into each chamber through the wind boxes 79 and the nozzles 78 is adjusted by valves 80. The quantity of air in the air/flue gas mixture is also adjusted by a valve 81. It is to be understood that oxygen-poor flue gases could also be injected into all of the chambers of the heat exchanger.

What is claimed is:

1. A method of decreasing nitrogen oxide emissions in a combustion installation for burning a fuel, wherein the installtion includes a hearth operating as a circulating fluidized bed for combusting the fuel which results in a flow of solid particles exiting the hearth, comprising the steps of:
    returing at least a fraction of the flow of solid particles resulting from the combustion of the fuel in the hearth to the hearth via a heat exchanger operating as a fluidized bed wherein the heat exchanger has a plurality of chambers; and
    feeding at least one of the plurality of chambers of the heat exchanger with a fluidization gas which is considerably poorer in oxygen than air, used alone or mixed with air, and wherein at least one of the plurality of chambers of the heat exchanger is fed with air alone.

2. A method according the claim 1, wherein the combustion installation includes a dust filter for removing dust from flue gases exiting the hearth, and wherein the oxygen-poor fluidization gas is constituted by a portion of the flue gases taken downstream from the dust filter.

3. The method according to claim 1, wherein the at least one of the chambers that is fed with air alone is the coldest chamber in the heat exchanger.

* * * * *